United States Patent [19]

Ritsema

[11] 4,318,458

[45] Mar. 9, 1982

[54] DISK BRAKE AND CONNECTING ASSEMBLY THEREFOR

[75] Inventor: Irving R. Ritsema, South Bend, Ind.

[73] Assignee: The Bendix Corporation, Southfield, Mich.

[21] Appl. No.: 137,091

[22] Filed: Apr. 4, 1980

[51] Int. Cl.³ ............................................. F16D 65/02
[52] U.S. Cl. ................................................. 188/73.44
[58] Field of Search .................... 188/71.3, 72.4, 73.3, 188/73.5, 73.43, 73.44, 73.45

[56] References Cited

U.S. PATENT DOCUMENTS 4,051,926 10/1977 Karasudani ...................... 188/73.3
4,084,665  4/1978 Burnett ............................. 188/73.3

FOREIGN PATENT DOCUMENTS 2252240  5/1974  Fed. Rep. of Germany ..... 188/73.3

Primary Examiner—Duane A. Reger
Attorney, Agent, or Firm—Paul David Schoenle; Ken C. Decker

[57] ABSTRACT

A disc brake includes a torque plate (14) which supports a caliper (20) via at least one pin assembly (24). The pin assembly comprises a first part (48) and a second part (50). The second part defines a first friction surface (55) with the first part and a second friction surface (57) with the caliper. The first friction surface generates less friction than the second friction surface to assist a rotor 12 in "knocking-back" a pair of friction elements (42) and (44), thereby substantially eliminating drag between the rotor and the pair of friction elements.

8 Claims, 6 Drawing Figures

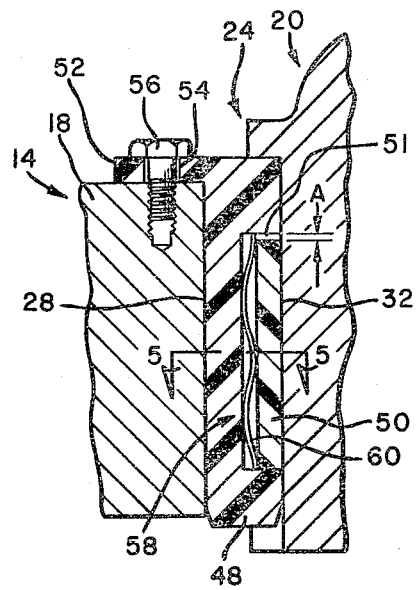
FIG. 3
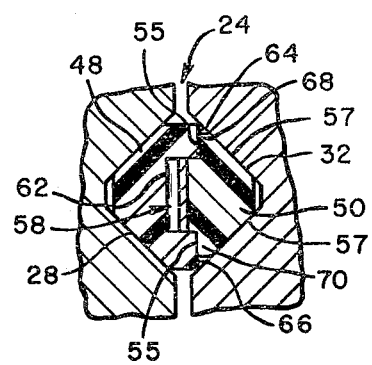
FIG. 5
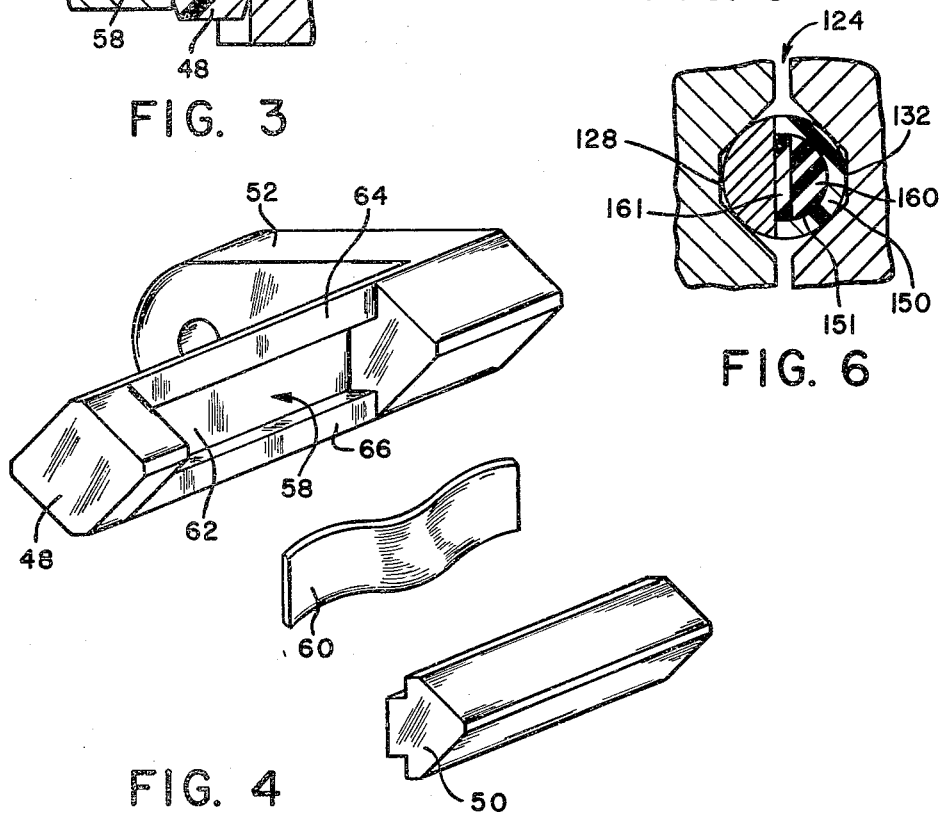
FIG. 4
FIG. 6

DISK BRAKE AND CONNECTING ASSEMBLY THEREFOR

The invention relates to a disc brake wherein a torque plate disposed adjacent a rotor to be braked movably carries a caliper via a pair of connecting assemblies. The torque plate and caliper define matching slots for receiving the pair of connecting assemblies. Consequently, the caliper is movable relative to torque plate and the pair of connecting assemblies during braking to bias a pair of friction elements into engagement with the rotor.

In U.S. Pat. No. 4,084,665 a pair of pins are disposed within matching slots on the torque plate and caliper. Each pin carries resilient members engageable with the torque plate and the caliper to movably support the caliper in spaced relation to the torque plate. Upon termination of braking, the piston associated with the caliper is retracted and the rotor is rotatable to generate a "knock-back" force causing the pair of friction elements to move away from the rotor. In order for the outer friction element to move away from the rotor, the "knock-back" force must be sufficient to move not only the outer friction element but also the caliper. Consequently, the pair of pins should provide a substantially frictionless surface for the caliper to move from a braking position to a retracted or non-braking position and also vice versa.

Other prior art is manifested in U.S. Pat. Nos. 3,616,877, 3,648,807 and 3,805,925 and in French Pat. No. 83,172.

The invention provides a pin assembly comprising a first part secured to the torque plate and a second part engaging the caliper. A resilient member between the first and second parts biases the second part into engagement with the caliper. The parts cooperate with each other to define a first sliding surface and the second part cooperates with the caliper to define a second sliding surface. The friction generated by the first sliding surface is less than the friction generated by the second sliding surface.

During braking, the caliper and second part move relative to the first part so that the second part generates friction on the first surface. Also, upon termination of braking, the caliper and second part move relative to the first part to generate friction on the first surface. The first part defines a channel for receiving the second part and the channel includes end walls limiting the movement of the first part to substantially a running clearance for an outer friction element. To accommodate lining wear for the outer friction element, the caliper is movable relative to the second part on the second sliding surface. In view of the lower friction generated on the first surface, the outer friction element and caliper are easily moved by the "knock-back" forces generated by the rotor to maintain a running clearance between the outer friction element and the rotor.

Preferably, the first part and second part are made from a plastic material so that movement between the plastic parts generates low friction.

It is an advantageous effect of the invention that the low friction generated by movement of the caliper relative to the torque plate enables the rotor to "knock-back" the outer friction element to define a running clearance for the latter. Consequently, drag between the rotor and the outer friction element is substantially eliminated.

The invention will be described in detail with reference to the drawings wherein:

FIG. 3 is an enlarged cross-sectional view taken along line 3—3 of FIG. 1;

FIG. 4 is an exploded view of the pin assembly shown in FIG. 3;

FIG. 5 is a cross-sectional view taken along line 5—5 of FIG. 3, and

FIG. 6 is a view similar to FIG. 5 showing an alternative construction for the pin assembly.

Figure 1:
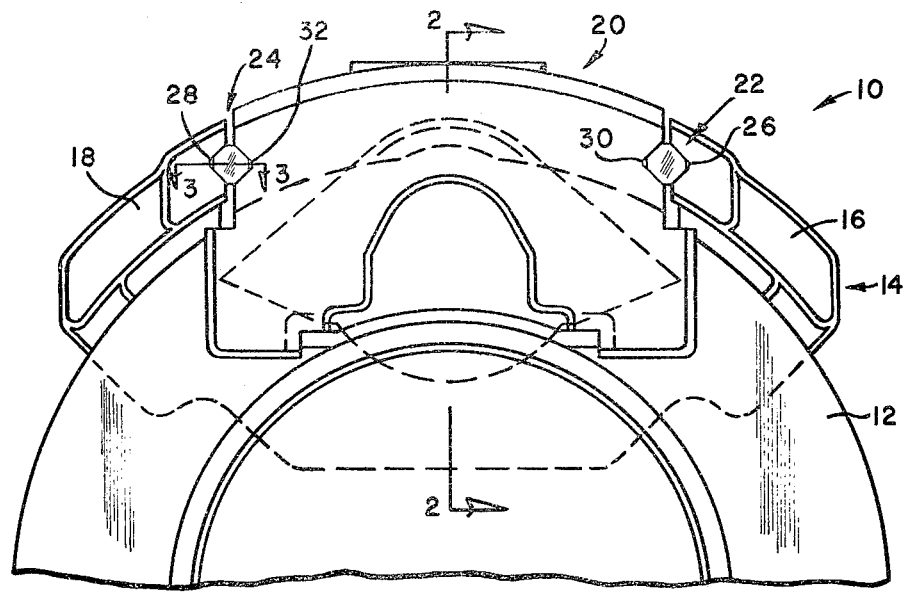
FIG. 1 is a front view of a disc brake constructed in accordance with the invention.

A disc brake generally referred to as numeral 10 shown in FIG. 1 is shown in FIG. 1. A rotor 12 rotates with a vehicle wheel assembly (not shown) and a torque plate 14 is fixedly secured to the vehicle for juxtaposition relative to the rotor 12. The torque plate is Y-shaped to form two arms 16 and 18 which extend axially over the outer periphery of the rotor 12. A caliper 20 is carried by the arms 16 and 18 via a pair of pin assemblies 22 and 24, which are described in detail hereinafter. Each arm defines a slot 26 and 28 and the caliper also defines slots 30 and 32 which align with the respective slots on the arms to receive the pin assemblies.

Figure 2:
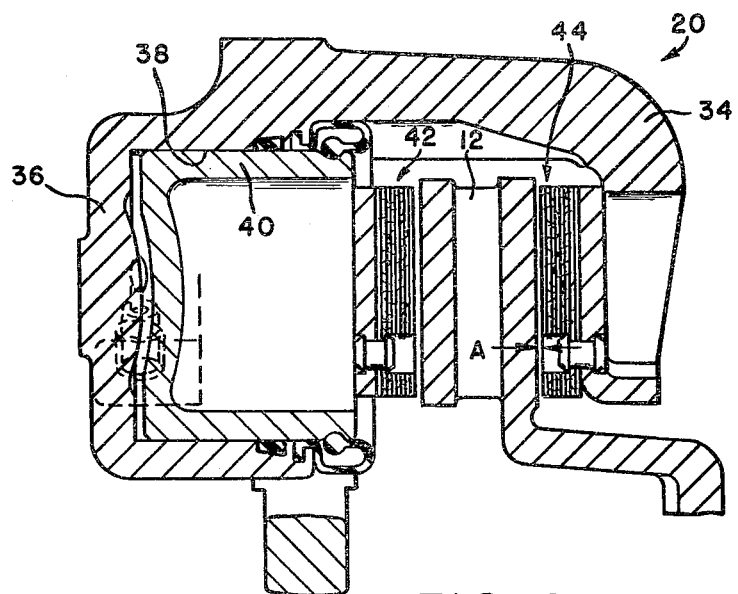
FIG. 2 is a cross-sectional view taken along line 2—2 of FIG. 1.

In FIG. 2, the caliper 20 includes a leg 34 extending radially inwardly on the outer side of the rotor 12 and a leg 36 extending radially inwardly on the inner side of the rotor 12. The leg 36 includes a bore 38 for receiving a piston 40 and the piston cooperates with the leg 36 to form a hydraulic actuator. An inner friction element 42 is engageable with the piston 40 and an outer friction element 44 is releasably connected to the leg 34. Consequently, during braking, the piston 40 moves toward the rotor 12 to bias the friction element 42 into engagement with the rotor. Reaction forces against the caliper move the caliper to bias the outer friction element into engagement with the rotor. With both friction elements engaging the rotor, braking torque is transmitted through one of the pin assemblies to a corresponding torque plate arm.

Turning to FIG. 3, the pin assembly 24 is shown disposed within arm slot 28 and caliper slot 32. The pin assembly 24 comprises a first part 48 and a second part 50. The first part 48 forms a flange 52 with an opening 54 for receiving a bolt 56 which is threadably received in a bore on arm 18 to secure the first part to the torque plate arm. A channel 58 is formed on the first part to movably receive the second part 50 and a resilient member 60 is disposed within the channel between the first part 48 and the second part 50. The first and second parts are made from a plastic material which generates low friction forces during sliding movement.

Viewing FIGS. 4 and 5, the channel 58 is stepped to form a bottom wall 62 and a pair of outer walls 64 and 66. The outer walls 64 and 66 oppose corresponding outer walls 68 and 70 on the second part 50 to form a first sliding interface 55 between the parts 48 and 50. The part 50 engages the caliper within the slot 32 to define a second sliding interface 57 between the caliper and second part. In the non-braking position of FIG. 3, the part 50 is normally disposed to one end of the channel 58 to define a gap 51 of dimension A at the other end of the channel 58. Consequently, the part 50 is movable between the end walls of the channel through a dimension A. Preferably, the dimension A is substantially equal to a desired running clearance A shown in FIG. 2.

Although the slots 28 and 32 shown in FIG. 5 are substantially V-shaped, it is possible to form a hexagon groove by means of slots 128 and 132 in FIG. 6. With the slots 128 and 132 forming a hexagon groove, the pin assembly 124 of FIG. 6 is circular in cross-section. The second part 150 is U-shaped to form a cavity 151 receiving a resilient member 160 and a spacer 161.

During braking the hydraulic actuator of the caliper biases the friction element 42 into engagement with the rotor 12. Reaction forces acting on the caliper cause the caliper to move upwardly viewing FIG. 3. The second part 50 is urged by the second sliding interface to move with the caliper and is also urged by the first sliding interface to remain stationary with the first part. Because the first interface is defined between plastic parts whereas the second interface is defined between a ferrous material for the caliper and a plastic material for the second part, the friction generated by the first interface is less than for the second interface. Consequently, the second part will move with the caliper during braking to take up the gap 51 so that the outer friction element will also take up the running clearance A to engage the rotor. In the absence of lining wear, the second part will move upward in FIG. 3 to abut the top end wall of the channel whereupon further movement will be prohibited by the engagement of the outer friction element with the rotor. Braking torque developed by the inner friction element will be transferred directly to the torque plate while the outer friction element will develop torque which is transferred to the caliper and to either arm of the torque plate via its associated pin assembly.

To accommodate lining wear, the caliper 20 is movable relative to the second part 50 at the second interface 57 after the second part has moved to abut the top end wall of channel 58 in FIG. 3. Upon termination of braking, the rotor will rotate freely, thereby generating a "knock-back" force urging the pair of friction elements to move away from the rotor. The inner friction element is free to return to its non-braking position when the piston is withdrawn in the bore. Since the outer friction element is attached to the leg of the caliper, the "knock-back" force must be strong enough to move the outer friction element and the caliper downwardly to the position in FIG. 3. Even with movement of the caliper relative to the second part 50 during braking to take up lining wear, the caliper and second part will only retract through a length A to re-establish gap 51. Because the second part 50 sees the friction at interface 55 and at interface 57 during retraction of the caliper, the second part moves relative to the first part at interface 55 with its lower friction. Also the lower friction between parts 48 and 50 offers less resistance to movement of the caliper and second part by the "knock-back" force of the rotor. Therefore, the caliper and attached outer friction element are readily moved upon termination of braking to re-establish the running clearance A between the rotor and outer friction element to substantially eliminate drag therebetween.

A further modification not shown herein replaces the resilient wave spring 60 with an elastomeric member within the channel 58 and a teflon spacer is disposed between the elastomeric member and the second part 50. There are many other modifications feasible by one skilled in the art and these modifications are covered by the appended claims.

I claim:

1. In a disc brake, a torque plate member fixedly disposed adjacent a rotor to be braked, a pair of friction elements engageable with the rotor during braking, a caliper member cooperating with the pair of friction elements to urge the latter into engagement with the rotor during braking, and a connecting assembly disposed between the torque plate member and the caliper member in order to movably mount the caliper member relative to the torque plate member characterized by said connecting assembly comprising at least a two-part assembly, one part of said connecting assembly being fixedly secured to one of said members, the other part of said connecting assembly being engageable with said other member and disposed in spaced relation to said one member, said other part being movable relative to said one part through a predetermined dimension during braking, and said predetermined dimension being set by said one part.

2. The disc brake of claim 1 in which said one part cooperates with said other part to define a first sliding surface therebetween and said other part cooperates with said other member to define a second sliding surface therebetween, and said first sliding surface generating less friction than said second sliding surface during braking.

3. The disc brake of claim 1 in which said one part defines a channel at an intermediate location and said other part is carried with said channel.

4. The disc brake of claim 3 in which said other part is resiliently biased outward of said channel by a resilient member, and said resilient member cooperates with said other part to define said first sliding surface.

5. In a disc brake having a torque plate fixedly disposed adjacent a rotor to be braked, a pair of friction elements engageable with the rotor during braking, a caliper movably carried relative to the torque plate via a connecting assembly, the caliper cooperating with the pair of friction elements to urge the latter into engagement with the rotor during braking characterized by said connecting assembly comprising a first part fastened to said torque plate and disposed within matching slots on said torque plate and said caliper and a second part engageable with said caliper, said first part defining a channel for movably receiving said second part, said channel including end walls limiting the movement of said second part relative to said first part, said first and second parts having surfaces which are movably engageable with each other to generate a first friction force opposing movement therebetween and said caliper and second part having surfaces which are movably engageable with each other to generate a second friction force opposing movement therebetween, and said first friction force being different than said second friction force.

6. The disc brake of claim 5 in which said first friction force is less than said second friction force.

7. The disc brake of claim 5 in which said second part is movable within said channel during braking through a predetermined dimension, said dimension substantially equalling a running clearance between one of the pair of friction elements and the rotor, and said caliper moving relative to said second part to accommodate lining wear for the pair of friction elements.

8. In a disc brake, a torque plate disposed adjacent a rotor to be braked, a caliper cooperating with a pair of friction elements to urge the latter into engagement with the rotor during braking, the torque plate and caliper defining substantially matching slots, a pin assembly disposed within the matching slots, the pin assemby movably mounting the caliper relative to the torque plate, the pin assembly including a first part secured to the torque plate and a second part engageable with the caliper, the second part being movable with the caliper during braking through a predetermined clearance defined by the first part, the first part cooperating with the second part during braking to generate a first friction force opposing movement of the second part relative to the first part, and the second part cooperating with the caliper to generate a second friction force opposing movement of the caliper relative to the second part, the first friction force being less than the second friction force.

* * * * *